UNITED STATES PATENT OFFICE.

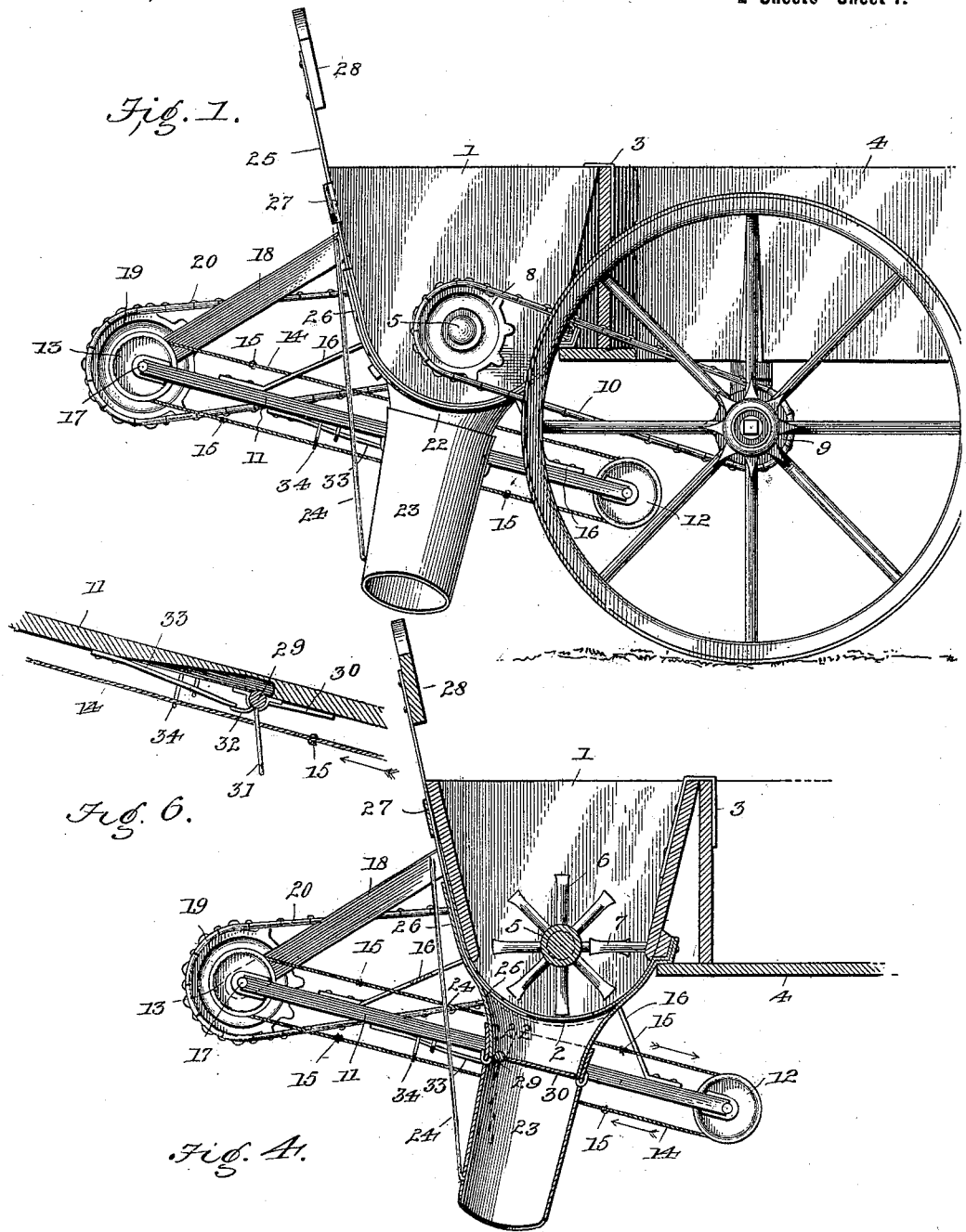

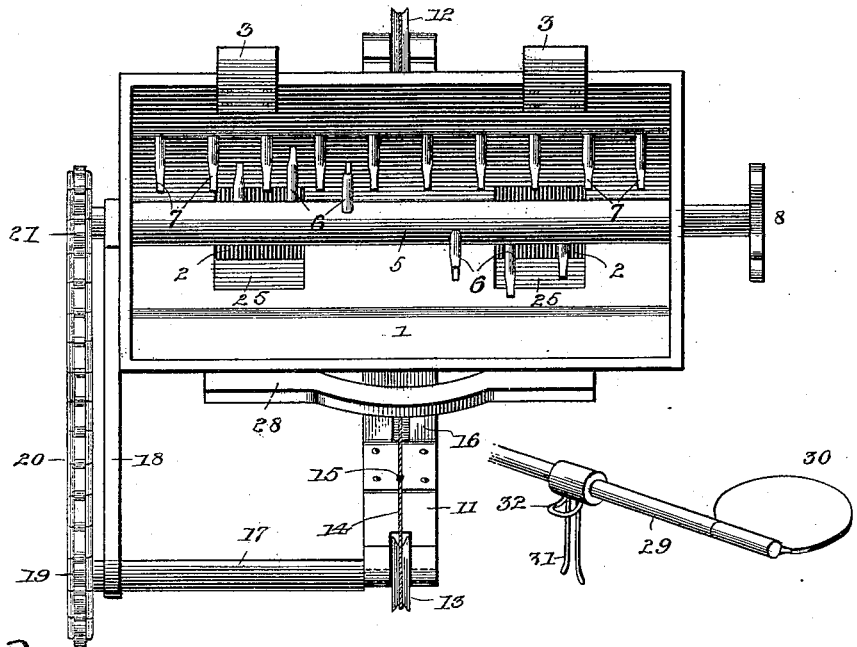
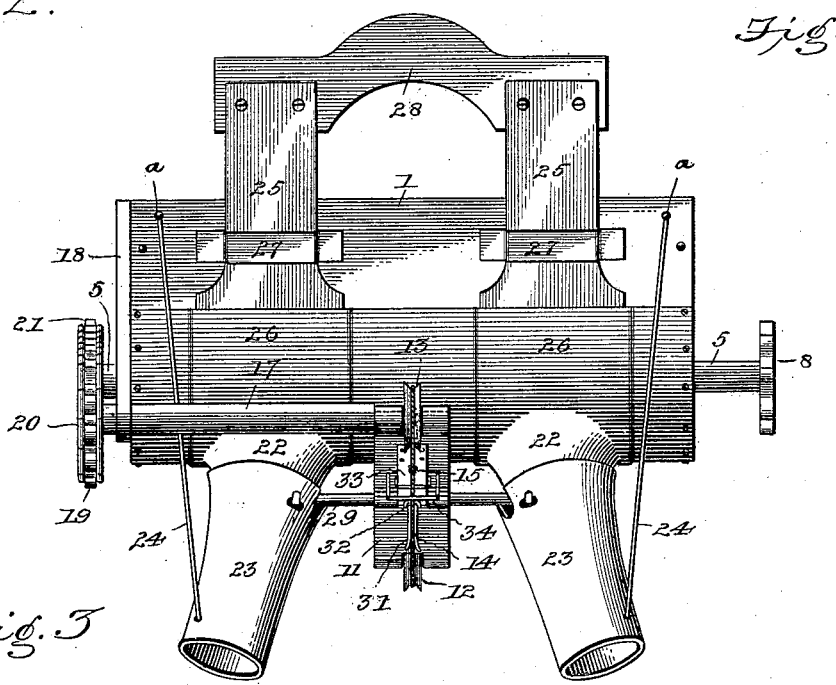

EQUIELLER BROOKS RAINEY, OF GLORY, TEXAS, ASSIGNOR OF ONE-HALF TO W. C. CROSS, OF SAME PLACE.

FERTILIZER-DISTRIBUTER.

SPECIFICATION forming part of Letters Patent No. 611,184, dated September 20, 1898.

Application filed April 18, 1898. Serial No. 678,013. (No model.)

*To all whom it may concern:*

Be it known that I, EQUIELLER BROOKS RAINEY, a citizen of the United States, residing at Glory, in the county of Lamar and State of Texas, have invented a new and useful Fertilizer-Distributer, of which the following is a specification.

This invention relates to mechanical appliances for distributing manure, compost, and like fertilizer either in hills or drills, as required. The mechanism is in the shape of an attachment and can be readily applied to any ordinary farm-wagon which serves to carry the fertilizer in bulk, an attendant shoveling the fertilizer from the wagon into the hopper of the distributer, when the mechanism loosens and lightens the fertilizer and drops it in desired quantity into the hill or drill.

The principal feature of the invention is the construction of a mechanism of the character and for the purpose aforesaid which can be quickly fitted to any style of farm-wagon and which will be positive in action and capable of adjustment to drop the fertilizer at any required distance apart.

Other objects and advantages are contemplated and will appear in the course of the following description, reference being had to the accompanying drawings, in which like parts are designated in all the views by the same reference characters.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation showing the application of a distributer constructed in accordance with this invention to a farm-wagon. Fig. 2 is a top plan view. Fig. 3 is a rear view. Fig. 4 is a longitudinal section showing the operation of a valve by dotted lines. Fig. 5 is a detail view in perspective of the rock-shaft having the valves attached thereto. Fig. 6 is a detail view showing the means for operating the rock-shaft.

The hopper 1 of the attachment is of oblong form, and its bottom is rounding and formed with discharge-openings 2 and is provided with plates 3, of hook form, which serve as means for connecting the attachment to the end-gate of the wagon-body 4. A shaft 5 is journaled at its ends in the end pieces of the hopper and is supplied with a series of teeth or pins 6, having a spiral arrangement and which are designed to loosen the fertilizer and secure a positive feed thereof through the discharge-openings 2. A series of teeth 7 extend from one wall of the hopper toward the shaft 5 and coöperate with the teeth 6, so as to break up and lighten the fertilizer prior to its delivery to the hill or furrow. The shaft 5 is provided at one end with a sprocket-wheel 8, which is connected with a corresponding sprocket-wheel 9, applied to an end of the hub of a rear ground-wheel of the wagon on the same side with the sprocket-wheel 8. A sprocket-chain 10 connects the sprocket-wheels 8 and 9 and communicates motion to the shaft 5 from the ground-wheel of the wagon, which acts in the capacity of a driver for operating the working parts of the fertilizer-distributer.

A bar or plate 11 is disposed centrally of the hopper in the line of motion of the wagon and inclines upwardly and rearwardly and is provided at its ends with grooved pulleys 12 and 13, around which passes an endless cord or rope 14, provided at intervals in its length with knots, buttons, or stops 15, which control the discharge of the fertilizer in the manner presently to be described. A double-ended bracket 16 is secured to the bottom side of the hopper, and its end portions have the bar or plate 11 secured thereto, said end portions being slotted for the passage therethrough of the upper portion of the cord or rope 14. A shaft 17 is journaled at its ends in bearings applied to the rear end of the bar 11 and to a bar 18, secured to an end of the hopper 1, and has the grooved pulley 13, secured to its inner end, and is provided at its outer end with a sprocket-wheel 19, which is connected by means of a sprocket-chain 20 with a sprocket-wheel 21, secured to a projecting end of the toothed shaft 5. This construction communicates motion to the shaft 17 from the shaft 5 and causes the endless cord or rope 14 to be set in motion when the mechanism is in active operation.

Spouts 22 depend from the hopper-bottom 1 and are in line with the discharge-openings 2, and boots 23 have loose connection at their upper ends with the lower terminals of the spouts 22 and serve to direct the fertilizer into the hills or drills. Rods 24 are connected at their lower ends with the lower extremities of the boots 23 and have adjustable connection at their upper ends with the rear portion of the hopper 1 and provide an adjustment for the boots according to the required distribution of the fertilizer. This adjustment is secured by means of screws or like fastenings $a$, which can be made to enter the rear wooden side of the hopper at any required point, as will be readily understood. The discharge-openings 2 are adapted to be regulated or entirely closed by cut-offs 25, which are flexible plates adapted to slide in spaces formed between the bottom side of the hopper and plates 26, secured thereto. The upper ends of the cut-offs 25 are reduced and are held to the rear side of the hopper by keepers 27, applied thereto, and a cross-piece 28 connects the upper ends of the cut-offs, so as to operate them alike, whereby the effective size of the discharge-openings may be adjusted so as to drop a like amount of fertilizer.

A rock-shaft 29 is journaled midway of its ends to bearings applied to the middle portion of the inclined bar or plate 11 and is provided at its ends with valves 30, which close the lower ends of the spouts 22. A fork 31 is secured to the middle portion of the rock-shaft, and the lower portion of the rope or cord 14 passes between the tines thereof. An arm 32 extends from the rock-shaft and is adapted to engage with the free ends of a spring 33, secured to the bar or plate 11, and which spring serves normally to hold the valves 30 closed and return them to a normal position when the fork 31 is released. The lower portion of the rope or cord 14 travels upwardly and rearwardly, thereby rocking the shaft 29 in its bearings and opening the valves 30 against the tension of the spring 33, and when a knot or button of the cord or rope 14 rides over the fork 31 and clears it the spring 33, regaining itself, returns the fork to a normal position and closes the valves. A guide 34 is secured to the lower side of the bar 11 a short distance from the rock-shaft and serves to hold the cord or rope in engagement with the fork until the valves have been opened a sufficient distance to permit of the discharge of the fertilizer. The attachment can be applied to any make or pattern of farm-wagon and can be operated from a wheel thereof by applying a sprocket-wheel, as 9, to an end of the hub thereof and connecting said sprocket-wheel 9 with the sprocket-wheel 8, applied to a projecting end of the toothed shaft 5. The fertilizer is placed in bulk in the body of the wagon and is supplied by an attendant to the hopper 1, and the lumps are broken up by the combined action of the teeth 6 and 7, said teeth 7 also serving to secure a positive feed of the fertilizer. By providing the knots, buttons, or stops 15 in sufficient number the valves 30 may be opened more or less frequently, thereby dropping the fertilizer in hills or drills.

Having thus described the invention, what is claimed as new, and desired to be secured by Letters Patent, is—

1. In an implement for the purpose specified, the combination of a hopper having a straight side and a rounded bottom, the latter formed with a discharge-opening, of a plate applied to the rounded bottom and extending part way along the lower portion of the straight side and having a space between it and the adjacent parts, a keeper applied to the upper portion of said straight side, and a flexible cut-off plate operating through the keeper and in the space formed between the plate and the straight and curved portions of the hopper, and self conformable to the straight and curved parts of the hopper, substantially as set forth.

2. In combination with a hopper having a straight side and a curved bottom, the latter formed with discharge-openings, a plate applied to the curved bottom and lower portion of the straight side of the hopper and forming a guide-space, independent keepers applied to the upper edge portion of the straight side of the hopper opposite the guide-spaces formed by the aforesaid plate, independent flexible cut-offs operating through the keepers and the said guide-spaces and bearing against the straight side of the hopper and self conformable to the curvature of the bottom and the straight side, and a cross-piece connecting the upper ends of the cut-offs, substantially as set forth.

3. The combination with a hopper having discharge-openings in its bottom, and spouts applied to the hopper and in communication with the said discharge-openings, of boots having their upper ends receiving the lower end portion of the spouts and having loose connection at their upper inner corners therewith, and means for adjustably connecting the lower outer corners of the boots with the hopper, substantially as set forth.

4. In a device of the nature indicated, a hopper having a discharge-opening therein, a valve for said opening, a bracket upon the hopper, said bracket having an opening therein, a bar supported by said bracket, pulleys upon said bar, a band upon said pulleys and passing through the opening in the bracket, whereby said band is guided, means between the band and the valve for operating the latter from the former, and means for imparting rotation to one of the pulleys, substantially as described.

5. In a device of the nature indicated, a hopper having a discharge-opening therein, a stirrer-shaft journaled in said hopper, a valve for the discharge-opening, a bar supported from the hopper, pulleys upon said bar, a band upon said pulleys, means between the band and the valve for operating the latter from the former, a second bar extending from said hopper, a shaft journaled at one end upon said second bar and having its opposite end secured to a pulley upon the first-mentioned bar, driving connections between the stirrer-shaft and the last-mentioned shaft, and means for rotating the stirrer-shaft, substantially as described.

6. In a fertilizer-distributer, the combination with a hopper having discharge-spouts, a double-ended bracket secured to the bottom side of the hopper and having its end portions slotted, an upwardly and rearwardly inclined bar or plate secured to the end portions of the bracket, grooved pulleys located at the ends of the said inclined bar or plate, and an endless cord or rope supported by the grooved pulleys and provided at intervals in its length with knots or projections, of a rock-shaft journaled in bearings applied to the inclined bar and having valves at its ends for normally closing the discharge-spouts, a fork projecting from a side of the rock-shaft and receiving a portion of the cord or rope between its members, an arm projecting from the rock-shaft, and a spring engaging with said arm and serving to normally hold the valve closed, substantially as set forth.

In testimony that I claim the foregoing as my own I have hereto affixed my signature in the presence of two witnesses.

EQUIELLER BROOKS RAINEY.

Witnesses:
J. H. RATLIFF,
O. W. LUDWICK.